United States Patent [19]

Osanai

[11] 4,388,660
[45] Jun. 14, 1983

[54] TAPE RECORDER EMPLOYING MINIATURE TAPE CASSETTE AND CAPABLE OF AUTOMATIC REVERSIBLE OPERATION

[75] Inventor: Akira Osanai, Hachioji, Japan

[73] Assignee: Olympus Optical Co. Ltd., Tokyo, Japan

[21] Appl. No.: 178,527

[22] Filed: Aug. 15, 1980

[30] Foreign Application Priority Data

Sep. 25, 1979 [JP] Japan .................................. 54/122754

[51] Int. Cl.³ .................... G11B 5/12; G11B 15/00; G11B 21/22; G11B 5/27
[52] U.S. Cl. .................................... 360/110; 360/90; 360/105; 360/121
[58] Field of Search ................ 360/90, 93, 110, 122, 360/78, 121, 74.1, 64, 105

[56] References Cited

U.S. PATENT DOCUMENTS

| | | | |
|---|---|---|---|
| 3,893,188 | 7/1975 | Shoemaker | 360/121 |
| 3,945,036 | 3/1976 | Karsh | 360/90 |
| 3,947,972 | 4/1976 | Freeman | 360/121 |
| 4,054,929 | 10/1977 | Levy | 360/90 |
| 4,159,492 | 6/1979 | Ban | 360/105 |
| 4,159,493 | 6/1979 | Ohta | 360/121 |
| 4,216,506 | 8/1980 | Ludtke | 360/74.1 |
| 4,309,733 | 1/1982 | Tomabechi | 360/96.1 |
| 4,319,293 | 3/1982 | Tomabechi | 360/109 |

FOREIGN PATENT DOCUMENTS 1333416 10/1973 United Kingdom .

Primary Examiner—Robert M. Kilgore
Attorney, Agent, or Firm—Weinstein & Sutton

[57] ABSTRACT

A tape recorder employing a miniature tape cassette and capable of automatic reversible operation is provided, including a pair of record/playback magnetic heads. One of the heads is disposed so as to be aligned with a track or tracks on a magnetic tape which are available for record or playback operation during the time the tape runs in a forward direction while the other head is disposed so as to be aligned with a track or tracks on the tape which are available for record or playback operation during the time the tape runs in a reverse direction.

4 Claims, 7 Drawing Figures

TAPE RECORDER EMPLOYING MINIATURE TAPE CASSETTE AND CAPABLE OF AUTOMATIC REVERSIBLE OPERATION

BACKGROUND OF THE INVENTION

The invention relates to a tape recorder employing a miniature tape cassette and capable of automatic reversible operation, and more particularly, to such a tape recorder which enables both a record and playback operation in either direction of running of a tape contained in a miniature tape cassette.

As is well recognized, a stereophonic tape recorder is known employing a tape cassette of a size, commonly referred to as a compact cassette, and capable of automatic reversible operation. Such a tape recorder utilizes a 4-track 4-channel magnetic head assembly 1 as shown in FIG. 1. The assembly 1 includes four magnetic heads, not shown, which are received within a shield casing 2, and the casing 2 is formed with a front curved wall in which four transversely elongate, rectangular windows 3a-3d are formed in vertical alignment with each other and through which the record/playback gaps 4a-4d of the four magnetic heads are exposed. It should be understood that the gaps 4a-4d are located in alignment with a magnetic tape 5 (see FIG. 5) which is contained in the compact cassette. During the running of the tape 5 in a forward direction, the upper two of the magnetic heads are activated to enable left- and right-hand channel signals to be recorded on or reproduced from a first and a second track 6a, 6b of the tape 5. Conversely, when the tape 5 runs in a reverse direction, the lower two of the magnetic heads are activated to enable left- and right-hand channel signals to be recorded on or reproduced from a third and a fourth track 6c, 6d of the tape 5.

In a compact cassette, the upper and lower walls in the region of a window which receive the magnetic head assembly 1 projects vertically beyond the outer wall of the remainder of the cassette, whereby the window has an increased area. Accordingly, it is a rather simple matter to manufacture a magnetic head assembly such as shown at 1 which can be inserted into the window. However, when a miniature tape cassette, which is commonly referred to as micro-cassette (registered trademark), the size of the cassette itself is reduced to one-quarter that of the compact cassette, and in addition, as shown in FIG. 4, windows 21, 22 each of which receives an associated magnetic head have upper and lower walls which do not project beyond the outer wall of the cassette 11, whereby the windows 21, 22 are narrow ones. Hence, it will be seen that it will be very difficult to manufacture a multiple channel magnetic head assembly which is capable of enabling a stereophonic record/playback operation by itself in a tape recorder employing such miniature tape cassette 11. If the manufacture is possible, the yield of manufacture will disadvantageously be very low.

On the other hand, it is also recognized that in currently used tape recorders capable of automatic reversible operation, there is an inconvenience that the tape running condition is not always the same during its running in both the forward and the reverse direction. This is attributable to a poor parallelism between a capstan and a pinch roller or a skewed mounting of guide pins and guide rollers within the cassette.

By way of example, FIG. 3 illustrates a record/playback operation utilizing a multiple channel head assembly 1. It may be assumed that when the tape 5 runs in the forward direction or in a direction indicated by an arrow a, there is no misalignment in azimuth with respect to the head 1, as illustrated at 5A, to permit an accurate record/playback operation. However, when the tape runs in the reverse direction or in a direction indicated by an arrow b, a misalignment in azimuth may occur as indicated at 5B, to prevent an accurate record/playback operation from being achieved. Thus the input or output to or from the tape 5 may change depending on the direction of running of the tape 5, causing a degraded frequency response during the time tape runs in the reverse direction.

SUMMARY OF THE INVENTION

In view of the foregoing, it is an object of the invention to provide a tape recorder employing a miniature tape cassette and capable of automatic reversible operation including a pair of record/playback heads which are arranged so that one of the magnetic heads is associated with a track or tracks on a magnetic tape which are available for record or playback during the running of the tape in a forward direction while the other magnetic head is associated with another track or other tracks on the magnetic tape which are available for record or playback operation during the running of the tape in a reverse direction.

In accordance with the invention, a record/playback head which is used during the running of the magnetic tape in the forward direction is separate from another which is used during the running of the tape in the reverse direction, so that the structure of the individual magnetic heads is simplified to facilitate its manufacture, as compared with a conventional magnetic head assembly in which a record/playback operation is enabled for either direction of running of the magnetic tape.

If the tape running condition is different between the both directions of tape running, the use of separate magnetic heads in these two directions permit a separate azimuth adjustment thereof in accordance with the direction in which the tape runs, thus assuring an optimum record/playback performance in either direction of tape running.

DESCRIPTION OF PREFERRED EMBODIMENTS

Figure 4:
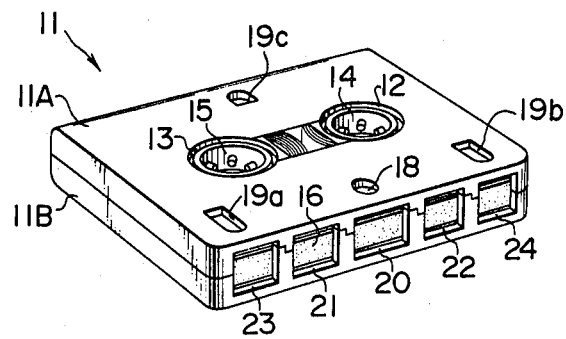
FIG. 4 is a perspective view of a miniature tape cassette which may be used in a tape recorder of the invention.

Referring to FIG. 4, there is shown a miniature tape cassette which may be used in a tape recorder capable of automatic reversible operation of the invention. Tape cassette 11 shown is commonly referred to as micro-cassette (trademark) as mentioned previously, and has opposite major surfaces, the area of which is substantially one-quarter that of a compact cassette. In other words, the size of the cassette 11 is on the order of a small packet of matches. The tape cassette 11 includes an upper cassette half 11A and a lower cassette half 11B, which are superimposed one above another to define a housing. The cassette is centrally formed with a pair of bores 12, 13 at locations symmetrical with respect to a transverse centerline thereof and through which a tape supply shaft 25 and a tape take-up shaft 26 (see FIG. 5) of a tape recorder are received. A tape supply hub 14 and a tape take-up hub 15 are rotatably disposed in the respective bores 12, 13, and a length of magnetic tape 16 has its opposite ends anchored to the both hubs 14, 15. An intermediate length of the tape 16 is held taut along the inside of a front wall of the cassette 11 by being passed around tape guide rollers 17a, 17b and the like (see FIG. 5).

A capstan aperture 18 is formed to extend through the opposite walls of the cassette centrally along the front edge of the cassette 11 while cassette locating holes 19a, 19b, 19c are formed in the opposite walls of the cassette at locations adjacent to the opposite ends of the front side and centrally toward the rear side. Also, the cassette 11 includes a front wall which is centrally formed with a pinch roller receiving window 20. A pair of record/playback head receiving windows 21, 22 are formed in the front wall on opposite sides of the window 20, and a pair of erase head receiving windows 23, 24 are formed in the front wall on the outer sides of the windows 21, 22.

Figure 5:
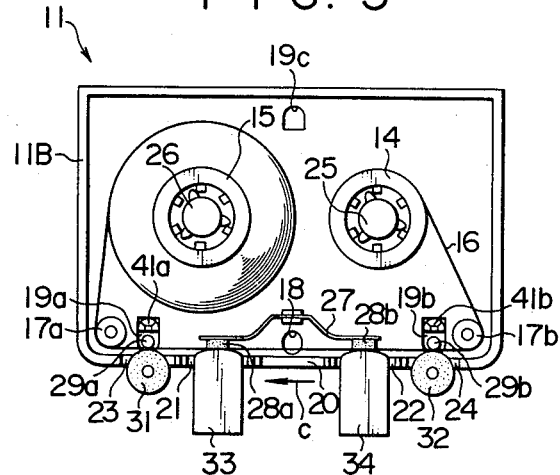
FIG. 5 is a plan view showing the internal construction of the miniature tape cassette shown in FIG. 4.

As shown in FIG. 5, a pair of tape pads 28a, 28b secured to the opposite ends of leaf spring member 27 are disposed adjacent to the front wall of the cassette 11 for abutment against a film base of the magnetic tape 16.

FIG. 5 shows essential parts of a tape recorder capable of automatic reversible operation and employing the miniature tape cassette 11 constructed as described above, which is constructed according to one embodiment of the invention. The tape recorder shown is of a dual capstan type wherein capstans 29a, 29b and cassette locating members 41a, 41b are received in cassette locating apertures 19a, 19b formed adjacent to the front side of the cassette 11, and pinch rollers 31, 32 are received in erase head receiving windows 23, 24 which are located in alignment with the apertures 19a, 19b. The tape recorder includes a pair of record/playback heads. A first magnetic head 33 is activated when the magnetic tape 16 within the cassette 11 is fed in the forward direction indicated by an arrow c while a second magnetic head 34 is activated when the tape 16 is fed in the reverse direction or in the direction opposite from that shown by the arrow c. The first magnetic head 33 has its front portion disposed in the window 21 and the second magnetic head 34 has its front portion disposed in the window 22 so that their front end face bears against the magnetic tape 16.

Figure 1:
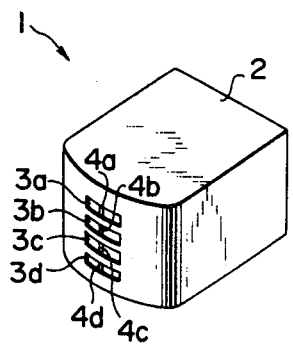
FIG. 1 is a perspective view of an example of a conventional record/playback head assembly which is used in a tape recorder capable of automatic reversible operation.
Figure 2:
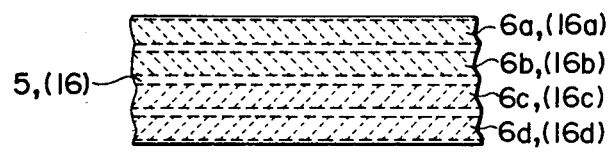
FIG. 2 is an enlarged top view of a magnetic tape, illustrating tracks defined thereon.
Figure 3:
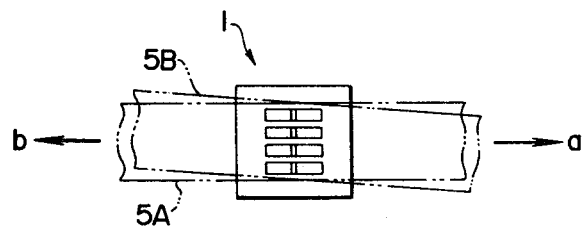
FIG. 3 is a schematic front view of a magnetic head illustrating differential running conditions of the tape depending on the direction of tape running.
Figure 6:
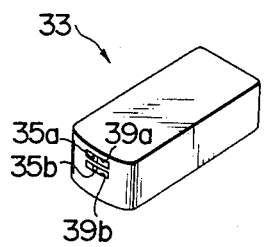
FIGS. 6 and 7 are perspective views of several forms of record/playback heads which are used in the tape recorder of the invention.
Figure 7:
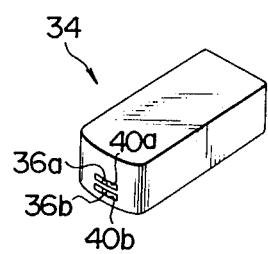

As illustrated in FIGS. 6 and 7, each of the first and the second magnetic head 33, 34 is constructed as a 4-track 2-channel magnetic head capable of a stereophonic record/playback operation. A pair of vertically aligned, transversely elongate rectangular windows 39a, 39b are formed in the upper one-half of the front curved wall of the first magnetic head 33, and magnetic gaps 35a, 35b which are utilized to effect record/playback operation are exposed through these windows. These magnetic gaps 35a, 35b are located so as to be aligned with the upper first and the second track 16a, 16b (see FIG. 2) of the magnetic tape 16 when the first head 33 is disposed in the window 21 formed in the cassette 11. A pair of vertically aligned, transversely elongate rectangular windows 40a, 40b are formed in the lower one-half of the front curved wall of the second magnetic head 34, and gaps 36a, 36b which are utilized to effect record/playback operation are exposed through these windows. The magnetic gaps 36a, 36b are located to be aligned with the lower third and the fourth track 16c, 16d (see FIG. 2) of the magnetic tape 16 when the second head 34 is disposed in the window 22 formed in the cassette 11.

By turning the first head 33 upside down, it becomes identical with the second head 34. Hence, it is only necessary to manufacture a single kind of head, and in use, the heads may be selectively used as the first and the second head.

While not shown, an erase head is disposed in the window 20 during a record operation, and bears against the magnetic tape to perform a magnetic erasure. Alternatively, an erase head may be assembled into each magnetic head 33, 34 so that it is activated only during a record operation.

When the tape cassette 11 is mounted in the tape recorder of the invention constructed as mentioned above, the first head 33 is activated when the tape 16 runs at a uniform rate in the forward direction indicated by the arrow c, performing a record or playback operation with respect to the first and the second track 16a, 16b of the tape 16. When the tape 16 runs at uniform rate in the reverse direction which is opposite from that indicated by the arrow c, the second head 34 is activated to perform a record or playback operation with respect to the third and the fourth track 16c, 16d of the tape.

While the first and the second record/playback head 33, 34 are constructed as a 4-track 2-channel head in the embodiment described above, they may be constructed as a two-track 1-channel head. Alternatively, they may be constructed as 2n-track n-channel head where n is an integer greater than two.

It should be understood that the tape recorder of the invention need not be constructed as a dual capstan type, but that the invention is equally applicable to a normal capstan drive in which a single capstan is utilized to run the tape at uniform rate.

What is claimed is:

1. A tape recorder employing a miniature tape cassette and capable of automatic reversible operation, comprising a pair of spaced-apart record/playback magnetic heads, a first one of the heads including first means being disposed so as to be aligned with a track or tracks of a magnetic tape which are available for record or playback operation during the time a magnetic tape runs in a forward direction, a second one of the heads including second means being disposed so as to be aligned with a track or tracks of a magnetic tape on the magnetic tape which are available for record or playback operation during the time the tape runs in a reverse direction, said first and second magnetic heads being identical in structure and being disposed in an opposite orientation relative to each other, so that said first and second means are each aligned with a different track or tracks of said magnetic tape.

2. A tape recorder according to claim 1 in which each of the first and the second heads is constructed as a 4-track 2-channel stereophonic record/playback head.

3. A tape recorder according to claim 1 further including a leaf spring member having mounted thereon a pair of tape pads disposed opposite to said pair of magnetic heads.

4. A tape recorder for use with miniature tape cassettes housing magnetic tape, comprising:
- a first and a second record/playback magnetic head disposed in said tape recorder in a spaced-apart arrangement;
- said first magnetic head including a first front end face for bearing against said magnetic tape;
- said second magnetic head including a second front end face for bearing against said magnetic tape;
- said first front end face including a first pair of windows formed in the upper half thereof for exposing magnetic gaps through said windows;
- said first pair of windows arranged to be in alignment with the upper two tracks of said magnetic tape;
- said second front end face including a second pair of windows formed in the lower half thereof for exposing magnetic gaps through said windows;
- said second pair of windows arranged to be in alignment with the lower two tracks of said magnetic tape and
- said first and second magnetic heads being identical in structure and being disposed in an opposite orientation relative to each other so that said first and second pairs of windows are each aligned with different tracks of said magnetic tape.

* * * * *